United States Patent [19]

Dali

[11] 4,150,873
[45] Apr. 24, 1979

[54] BI-DIRECTIONAL OPTICAL SCANNING

[75] Inventor: George J. Dali, Rochester, N.Y.

[73] Assignee: Eastman Kodak Company, Rochester, N.Y.

[21] Appl. No.: 820,487

[22] Filed: Jul. 29, 1977

[51] Int. Cl.$^2$ .............................................. H04N 1/10
[52] U.S. Cl. .................................... 358/285; 358/212; 358/294
[58] Field of Search ................ 358/199, 206, 208, 212, 358/229, 285, 293, 264, 265, 268, 286; 250/567

[56] References Cited

U.S. PATENT DOCUMENTS

| Re. 28,016 | 5/1974 | Koizumi | 355/65 |
|---|---|---|---|
| 3,524,928 | 8/1970 | Hoskins | 355/66 |
| 3,528,738 | 9/1970 | Hodges | 355/70 |
| 3,830,972 | 8/1974 | McHugh et al. | 358/213 |
| 3,886,371 | 5/1975 | Lloyd | 358/285 |

*Primary Examiner*—Robert L. Griffin
*Assistant Examiner*—Edward L. Coles
*Attorney, Agent, or Firm*—Warren W. Kurz

[57] ABSTRACT

An optical document scanning device minimizes the time period between the end of one page scan and the beginning of the next page scan by page scanning in opposite directions during successive scan cycles. During each scan cycle, the optical image of the document is converted into a serial electric signal which is arranged by appropriate logic and storage devices so as to be presented to an output device, such as a printer, in a uniform page scan direction, e.g. top to bottom, regardless of the direction of page scan input.

2 Claims, 5 Drawing Figures

BI-DIRECTIONAL OPTICAL SCANNING

CROSS-REFERENCE TO RELATED APPLICATIONS

Reference is made to commonly assigned, co-pending U.S. Patent Application Ser. No. 740,699, entitled DOCUMENT COPYING APPARATUS, filed Nov. 1, 1976 in the name of John H. Ladd, now U.S. Pat. No. 4,058,828.

BACKGROUND OF THE INVENTION

1. Field of the Invention

This invention relates generally to document scanning apparatus for placing a line-by-line image of a stationary document on a linear photosensitive surface.

2. Description of the Prior Art

In high speed document scanning, it is often desirable to keep the document being scanned stationary because of the problems associated with high speed paper handling. While in some copying apparatus, an image of an entire document may be flashed onto a photoresponsive surface at once, it is preferable in other instances to page scan the stationary document a line at a time. Such instances include those wherein power concern makes it impractical to illuminate the entire document at once, where a linear photosensitive array is provided as the image receptor, where the printer operates a line at a time and/or where the image is to be converted into a series of electrical signals. In prior art devices for "page scanning" stationary documents (i.e. scanning documents a line at a time), a lens, a mirror or another optical element is moved through a path such that a flowing line image of the stationary document is produced at a photosensitive receptor. The optical element projects successive line segments onto the receptor, which may be a rotating drum as in U.S. Pat. No. 3,528,738, moving web as in U.S. Pat. No. Re. 28,016 or stationary array of photosensors as in co-assigned U.S. Patent Application Ser. No. 740,699 filed Nov. 11, 1976 in the name of John H. Ladd, now U.S. Pat. No. 4,058,828.

In such apparatus having moving scanning elements, after each image has been projected upon the photosensitive surface, the scanning elements must return to their original starting positions before the next cycle. This limits the speed of the overall copy cycle by necessitating that a "return period" be provided for the elements. If an attempt is made to decrease the copy cycle period by increasing the return speed, high levels of acceleration and deceleration, accompanied by excessive forces, wear and vibration, are soon encountered.

In co-assigned U.S. Pat. No. 3,528,738 which issued Sept. 15, 1970 to H.T. Hodges, these detrimental effects were solved, insofar as they resulted from returning the scanning lights for slit illumination to their starting position, by providing multiple light units which always move in the same direction around a closed path. However, the scanning optics were unmodified from earlier copiers and still required a period for return motion.

That return period was utilized in the scanning system disclosed in U.S. Pat. No. 3,524,928 which issued to T. A. Hoskins on Aug. 18, 1970. Hoskins discloses a document scanner comprising two distinct optical systems. As one optical system moves in a direction to page scan the document, the other optical system moves to a position to commence a second page scan as soon as the first optical system completes its page scan. While the first optical system returns to its initial position, the second optical system scans the document. By this arrangement, there is no time wasted between successive page scans. While the speed of the Hoskins system is not limited to the return period of its scanning optics, it requires two separate optical systems, the movements of which must be synchronized. As may be readily appreciated, this adds considerably to the cost of the system.

SUMMARY OF THE INVENTION

By the present invention I have provided apparatus for increasing the rate of operation of a moving optical scanning device by minimizing the time period between the end of one scan cycle and the beginning of the next without encountering either excessive inertia loads during the scan cycle or the need for complex drives. The invention includes a scanning device which page scans in two, opposed directions so as to scan a complete document one line at a time in one direction during one scan cycle and to scan a complete document in the other, opposed direction during the succeeding scan cycle. By thus alternating the direction of page scan, there is no time period required for returning the elements to a start position.

In one embodiment of the present invention, a linear photoresponsive array converts the optical image into electrical information. Control logic is provided so that the information is applied to an output device, such as a memory or a printer, in for instance top to bottom page scan sequence regardless of the page scan sequence of the input information. With this arrangement, the need for returning the scanning elements to their start positions after each half cycle is eliminated, along with the high inertia forces and the complexity of mechanical drives associated therewith. In addition, the invention enables the interval between scanning cycles to be appreciably reduced over that associated with apparatus wherein the scanning elements must be returned to a start position after each page scan.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

Scanner

Figure 1:
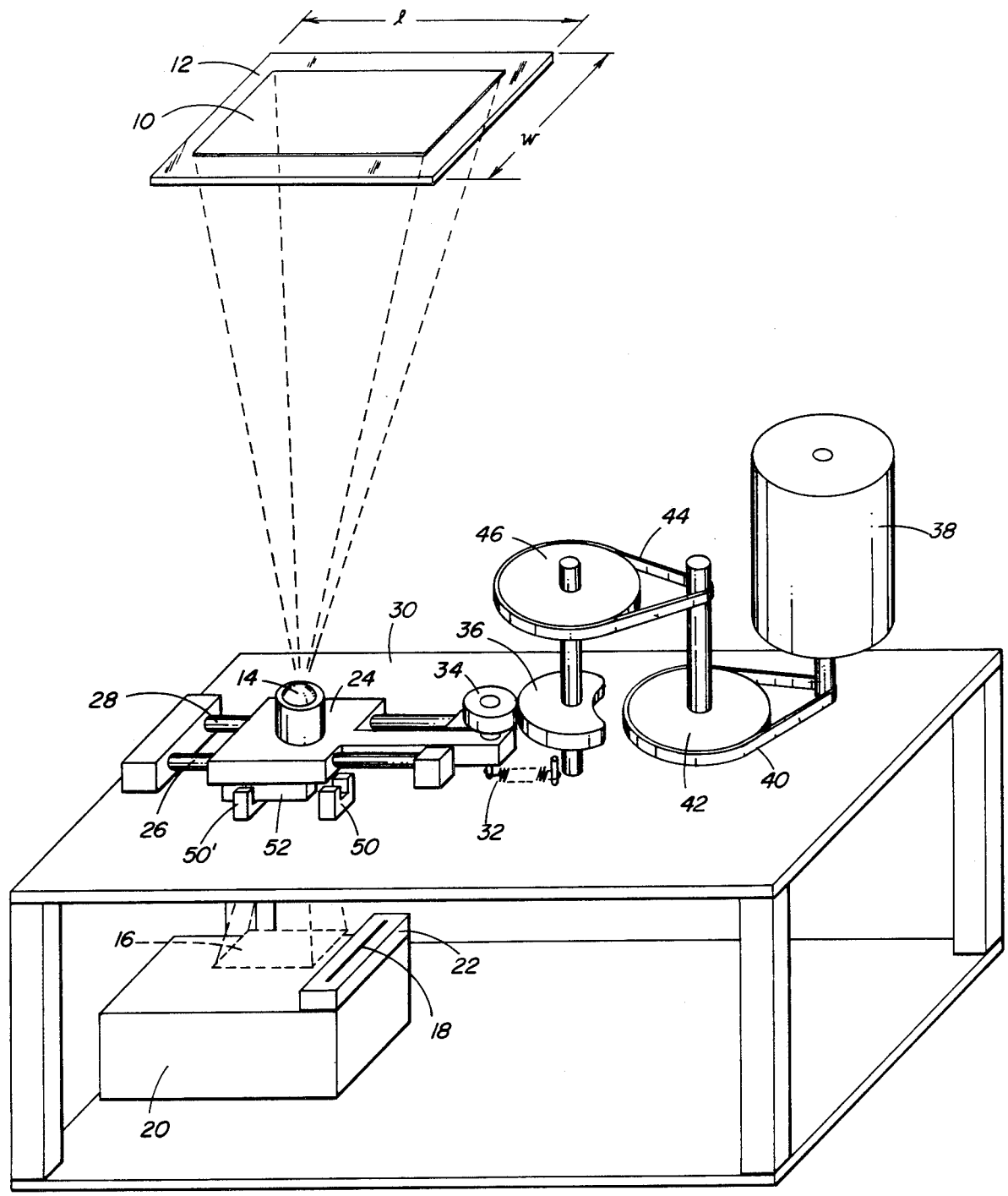
FIG. 1 is a schematic view showing the scanning apparatus of a preferred embodiment of the invention.

In FIG. 1, a document 10 bearing an image is placed face down on a transparent platen 12 of a composing station where it is illuminated by a suitable light source (not shown). An aerial image of document 10 is formed by a lens 14 at a focal plane 16 which is coincident with the surface of a line of photosensors 18 on a linear charge coupled device (CCD) array 22. Such CCD arrays are well known and serve to convert the light pattern to electrical signals which may be clocked out of the CCD in the form of a series of electrical signals and applied to electronics and logic 20 in a manner to be explained in detail hereinafter. Of course other forms of photosensor arrays (such as photodiodes, charge coupled photodiode arrays, etc.) may be used instead of CCD array 22.

Lens 14 is mounted on a carriage 24 which is slidably carried by rails 26 and 28 on housing plate 30. Carriage 24 is urged to the right as illustrated by a coil spring 32 so that a cam follower 34 rotatably mounted on the carriage is held against a cam disc 36. Cam disc 36 is rotated by constant speed drive means comprising a synchronous motor 38, a resilient belt 40 to prevent the transmission of motor rumble, a flywheel 42, a belt 44 and a second flywheel 46. Belt 44 may be of Mylar material so as to tightly couple the inertia of flywheel 42 to cam disc 36 without transmitting high frequency flutter.

As cam plate 36 is rotated by the drive means, carriage 24 will move in a reciprocal fashion and the aerial image formed by lens 14 will move in focal plane 16 over the line of photosensors 18 of CCD 22. As will be understood, it is preferable that carriage 24 quickly and smoothly accelerate to a constant scanning velocity before the aerial image reaches photosensors 18, maintain the constant velocity while the image is being scanned and then reverse its direction and reach scanning velocity before the image returns to the photosensors.

The length of scan or total transverse displacement of carriage 24 is determined by the magnification m of the system and the overtravel needed for acceleration and deceleration. System magnification is the ratio of the dimension w' of the projected image at the focal plane (the length of linear photosensor array 18) to the dimension w of original document 10, or:

$$m = w'/w \tag{1}$$

Accordingly, of its total travel, the portion L over which the carriage must move at a constant speed is given by $$L = ml/(m + 1), \tag{2}$$

where l is the dimension of document 10 in the direction of scan.

Timing

A pair of slotted detectors 50 and 50' are mounted below carriage 24 and each includes a light beam source and photodetector (not shown) on respective sides of the slot. A vane 52 depends from carriage 24 for movement therewith into and out of the slot in detectors 50 and 50' so as to interrupt the light beam. Each detector sends an electrical signal having a characteristic indicative of whether or not the beam reaches the photodetector to electronics and logic 20 as will be discussed hereinafter.

Figure 2A:
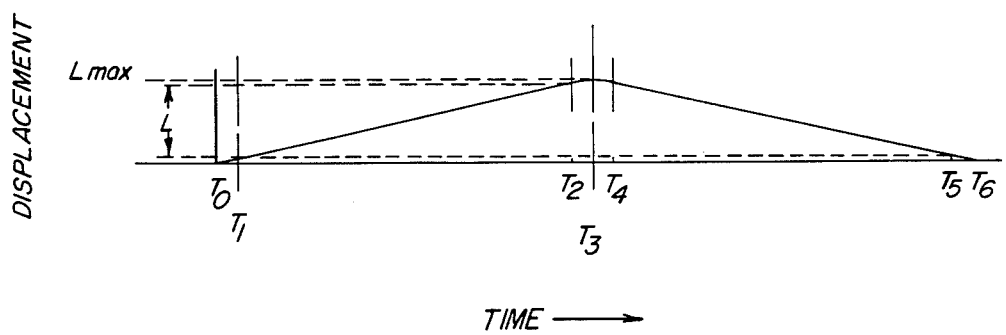
FIGS. 2(a) and 2(b) are timing diagrams depicting the sequence of operation of certain elements shown in FIG. 1.
Figure 2B:
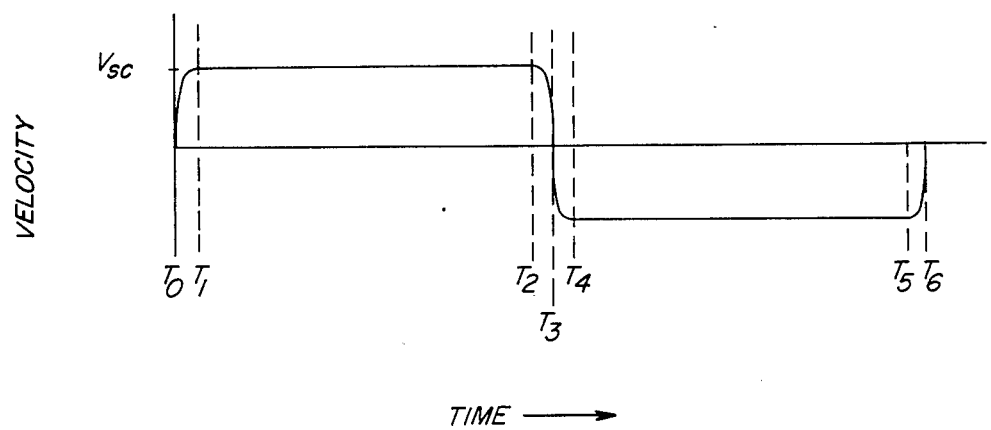

FIG. 2(a) is a characteristic curve showing the linear position of carriage 24 throughout a single revolution of cam disc 36 starting from, say, the leftmost position of carriage 24 as shown in FIG. 1. FIG. 2(b) shows the variation in velocity of the carriage during the cycle. At time $T_0$, assuming that the apparatus has been running sufficiently long to be at constant speed and carriage 24 is in its leftmost position as shown in FIG. 1, vane 52 is in detector 50' and the carriage begins accelerating from zero velocity to reach its scanning velocity $V_{SC}$ by time $T_1$ (when the projected image reaches array 18). At time $T_1$, vane 52 clears the slot in detector 50', which emits an appropriate signal. At time $T_2$, vane 52 enters detector 50 and carriage 24 has moved through its constant speed portion L of its scan length and begins to decelerate to stop at time $T_3$, and then to begin accelerating in the opposite direction. Constant velocity in a leftward direction is reached by time $T_4$ (when vane 52 clears the detector 50 slot) and continues until time $T_5$, when vane 52 enters detector 50' and the carriage begins deceleration for the next cycle. The maximum displacement $L_{max}$ in FIG. 2(a) of carriage 24 is the sum of the constant speed portion L and the overtravel at each end of the scan needed for acceleration and deceleration.

Figure 3A:
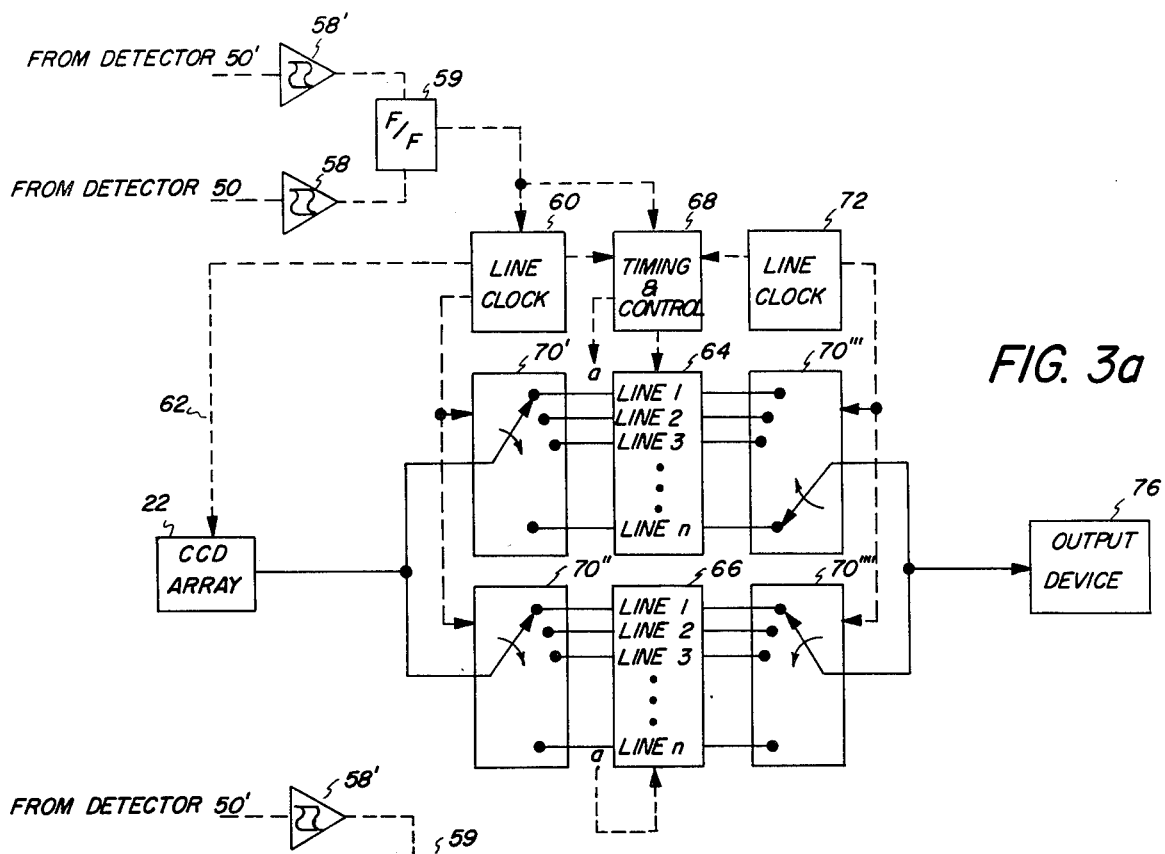
FIGS. 3(a) and 3(b) are schematic block diagrams of electronic signal processing apparatus which can be incorporated in the illustrative embodiment of the invention.
Figure 3B:
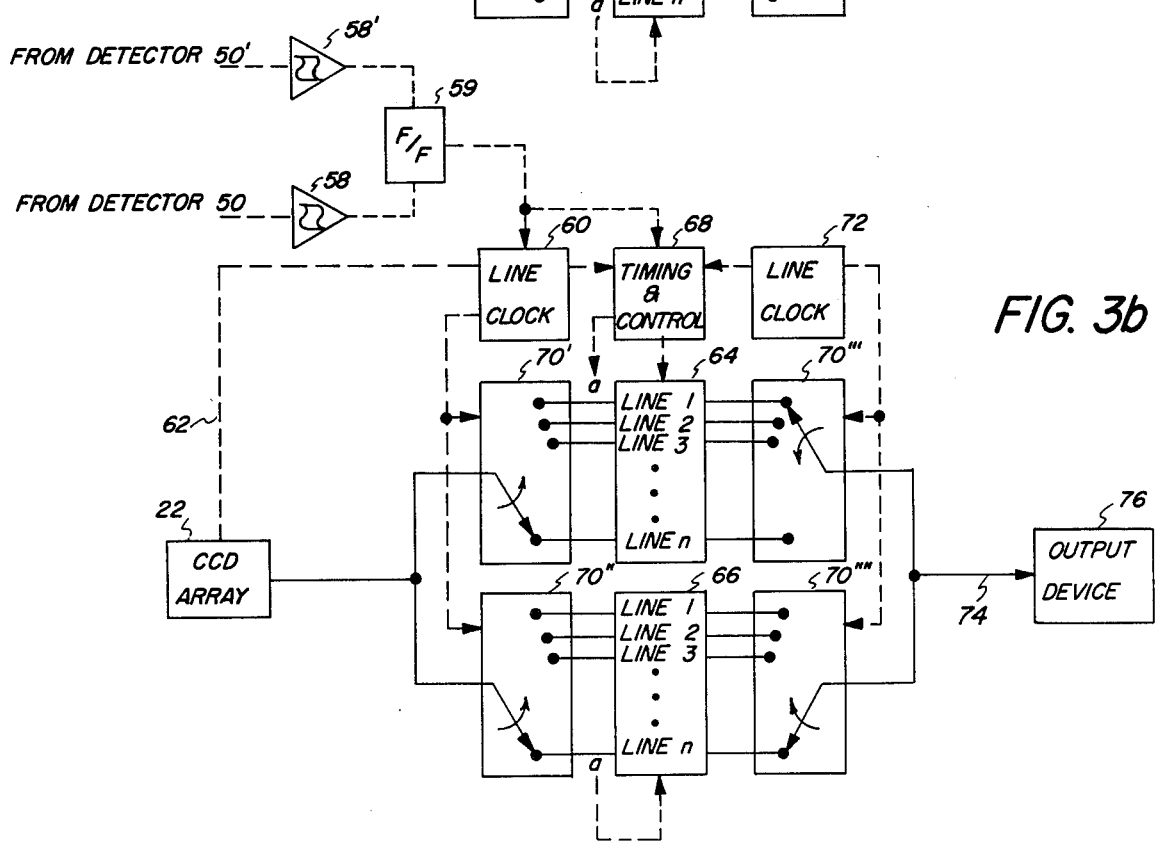

FIGS. 3(a) and 3(b) are block diagrams of the components in electronics and logic 20 in different stages of operation. When carriage 24 is moving to the left as shown in FIG. 1 and vane 52 clears the slot of detector 50, the photodetector associated with that detector emits an electrical signal. Likewise, when carriage 24 is moving to the right and clears the slot in detector 50', the photodetector associated with detector 50' emits an electrical signal. A pair of Schmitt trigger circuits 58 and 58', respectively, receive the signals from detectors 50 and 50' and control a set-reset flip flop (bi-stable multivibrator having two stable states 1 and 0) 59. If triggered by circuit 58 (carriage 24 moving from right to left), flip flop 59 is set to 1, and if triggered by circuit 58' (carriage 24 moving from left to right), flip flop 59 is reset to 0. A line clock 60 is provided and might for example take the form of a multiple phase clock and binary counter (such as the Intel model 5244 from that Company's 1977 Data Catalog). Line clock 60 (which is shown as being free running, but which may be driven by carriage 24 movement) receives the output from flip flop 59 to thereupon begin counting and to emit a clock pulse in timed relationship with carriage 24 movement and the number n of scan lines to be made per unit of carriage displacement. The clock pulses are transmitted via control line 62 to CCD array 22 to clock out the CCD array once per scan line. CCD array 22 has its own picture element (pixel) clock which operates at a rate such as to clock out the entire array once per scan line.

The serial electrical image information clocked out of CCD array 22 is stored in one of a pair of memory buffers 64 and 66 depending upon the state of the memory controller, which has been schematically shown as five separate functional boxes (one timing and control unit 68 and four address counting circuits 70', 70", 70''' and 70''''). Memory buffers 64 and 66 may for example be Intel models IN-1600 General Purpose Random Access Memory Systems from the aforementioned catalog, while the memory controller may include a plurality of up/down counters cascaded together for indexing the memory address register. One such counter is Texas Instrument's model SN 74 LS 193 shown on page 427 of the TTL 1973 Data Book.

Depending upon whether memory timing and control unit 68 receives a 0 or 1 signal from flip flop 59 it will switch one of buffer memories 64 and 66 from a read state to a write state and the other buffer memory from a write state to a read state. Address counting circuits 70' and 70" are indexed once per scan line by line clock 60 so that data from separate scan lines are stored in appropriate locations in buffer memories. Timing and control unit 68 receives a pulse from line clocks 60 and 72 for synchronication with the start of each scan line. When in its write state, the addressing of the buffer memories is determined by address counting circuits 70''' and 70'''' as controlled by a second line clock 72 in synchronization with the speed of output device 76. For instance, if the output device is a printer, line clock 72 will receive a "top of page" pulse similar to that from flip flop 59, and its clock rate will be predetermined by the line printing rate. Of course the printer must operate at the same rate as the scanner, or a memory buffer may be needed as a part of output device 76.

Sequence of Operation

As carriage 24 is moving from the left as shown in FIG. 1, a set (1) or reset (0) pulse is transmitted to line clock 60 and control unit 68 from flip flop 59. The control unit will place, for instance, buffer memory 64 in a read state and buffer memory 66 in a write state. CCD array begins clocking out image data to buffer memory 64, and the image data is addressed into the memory in (schematic) top to bottom order by address circuit 70'. While image information is being stored in memory 64, memory 66 is reading out, as explained hereinafter. However since the data in memory 66 is not meaningful, it wil be ignored by the output device, which will operate with a one scan line time lag from the scanner.

Aftr a document has been page scanned and the image data thereon stored in buffer memory 64, cam 36 (FIG. 1) causes carriage 24 to reverse direction. When vane 52 clears the light beam in detector 50 or 50', another, different pulse is sent from flip flop 59 to line clock 60 and timing and control unit 68, the latter of which switches the memory modes so that buffer memory 64 is now in its write state and buffer memory 66 is in its read state.

At the start of the next (second) page scan, the logic is as schematically shown in FIG. 3(b) so that image information from CCD array 22 is addressed into buffer memory 66 in (schematically) bottom to top order by address circuit 70''. Simultaneously, image data previously stored in buffer memory 64 is read from that memory at a rate determined by second line clock 72 in top to bottom line order (the same order the data was stored). That data is transmitted via an information line 74 to an output device 76 which might take the form of a printer, a storage memory, an electronic network for image enhancement, etc.

After the second page scan has been completed, address circuits are once again as shown in FIG. 3(a) and the next flip flop pulse causes memory controller 68 to switch memory 64 to its read state and memory 66 to its write state. Scanning proceeds as in the case of the first page scan. However, there is now image data (from the second page scan) in buffer memory 66. That data is read out of the memory from top to bottom as shown; the opposite order of how it was read into the memory. Accordingly, while the second page scan was from bottom to top, the image data therefrom is fed into output device 76 from top to bottom.

The sequence of events described above continues until all the desired page scans have been effected. The image data from every other page scan is withdrawn from the buffer memories in reverse line order to the order it was read into the memory so that output device 76 receives the image data from each scan in the same line order.

The invention has been described in detail with particular reference to a preferred embodiment thereof, but it will be understood that variations and modifications can be effected within the spirit and scope of the invention.

I claim:

1. Copy apparatus having means for receiving a document to be copied; said apparatus comprising:

linear photoreceptor array means for repeatedly generating a series of electrical signals which are representative of discrete areas of a line of radiant energy incident thereon;

means for scanning successive lines of a light image of a received document across said array means in a first direction, from one edge of a received document toward the other edge and then, during the next successive copy cycle, in a second direction from said other edge toward said one edge;

buffer memory means, associated with said array means, for receiving the electrical signals in the line order generated; and means for (1) withdrawing from said buffer memory means in the line order received, the electrical signals generated during said first direction scans, and (2) withdrawing from said buffer memory in a line order opposite to that received, the electrical signals generated during said second direction scans.

2. The invention as defined in claim 1 further comprising:

means for detecting and for generating a signal indicative of the direction of document scan.

* * * * *